US012627390B2

(12) United States Patent
Chen et al.

(10) Patent No.: US 12,627,390 B2
(45) Date of Patent: May 12, 2026

(54) PROVIDING ARBITRARILY LONG TIMER FROM SHORTER UNDERLYING HARDWARE COUNTER

(71) Applicant: Arista Networks, Inc., Santa Clara, CA (US)

(72) Inventors: Yin Chen, Burnaby (CA); Andrew Peter Maxwell, Sunnyvale, CA (US); Avininderpal Singh Grewal, Langley (CA); Jeff Chan, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 334 days.

(21) Appl. No.: 18/448,758

(22) Filed: Aug. 11, 2023

(65) Prior Publication Data

US 2025/0055587 A1 Feb. 13, 2025

(51) Int. Cl.
*H04J 3/06* (2006.01)
(52) U.S. Cl.
CPC ................................... *H04J 3/067* (2013.01)
(58) Field of Classification Search
CPC ........ H04J 3/0667; H04J 3/067; H04J 3/0697; G06F 1/04; G06F 1/14
See application file for complete search history.

(56) References Cited

U.S. PATENT DOCUMENTS

| | | | | |
|---|---|---|---|---|
| 7,562,105 B2 * | 7/2009 | Liu | ........................... | G06F 9/30 |
| | | | | 713/502 |
| 8,670,439 B2 * | 3/2014 | Wei | ........................ | H04L 7/041 |
| | | | | 709/248 |
| 8,775,849 B2 * | 7/2014 | Sorbara | ................. | H04J 3/0638 |
| | | | | 713/400 |
| 9,231,754 B2 * | 1/2016 | Wei | ....................... | H04J 3/0638 |
| 9,407,733 B1 * | 8/2016 | Mizrahi | ................ | H04J 3/0697 |
| 10,594,423 B1 * | 3/2020 | Anand | ................... | H04J 3/0664 |
| 11,290,250 B2 * | 3/2022 | Sarda | ........................ | H04L 7/04 |
| 11,637,645 B1 * | 4/2023 | Novellini | ............... | H04J 3/0664 |
| | | | | 370/503 |
| 2016/0006526 A1 * | 1/2016 | Cho | ...................... | H04J 3/0667 |
| | | | | 370/503 |
| 2020/0127752 A1 * | 4/2020 | Tai | ........................ | H04J 3/0667 |
| 2022/0060311 A1 * | 2/2022 | Tai | ........................ | H04J 3/0697 |

* cited by examiner

*Primary Examiner* — Alpus Hsu
(74) *Attorney, Agent, or Firm* — Sprinkle IP Law Group

(57) ABSTRACT

Systems and methods for extending an original bit length counter maintained by hardware of a network device to generate an extended length timestamp of a longer bit length are disclosed. The extension of the original bit length counter is based on a rollover counter, where the rollover counter is incremented based on the detection of rollovers of the original bit length counter.

20 Claims, 5 Drawing Sheets

PROVIDING ARBITRARILY LONG TIMER FROM SHORTER UNDERLYING HARDWARE COUNTER

BACKGROUND

Oftentimes in various computing applications precision timing (e.g., sub-microsecond) is required. To aid in the implementation of such precision timing applications, hardware timers may be provided in Application Specific Integrated Circuits (ASICs) or other types of processors, such as Central Processing Units (CPUs), microprocessors, Graphics Processing Units (GPUs), etc. These hardware timers may, for example, be Time of Day (TOD) counters or the like. As such, these hardware timers may be used for providing timestamps for various uses. These timestamps may thus be heavily utilized in certain contexts or environments where timing or synchronization is of utmost importance. One such context is networking, where the implementation and use of network devices (e.g., hardware or software utilized in a network, collectively referred to as network devices or elements interchangeably) may depend on accurate timing.

Accordingly, timestamps may be used for various functions in the operation of computing devices, including network devices or the like. For example, in the context of network devices the implementation of certain protocols involved with the synchronization of timing between network elements in a network environment may require such timestamps. For example, the IEEE 1588v2 Precision Time Protocol (PTP) defines a packet-based time synchronization method that provides frequency, phase, and TOD information with sub-microsecond accuracy.

While certain hardware may provide counters that can be used for generating the timestamps needed in these contexts, in certain cases longer time values than are provided in the hardware may be desired. Specifically, the hardware counters may be of shorter bit length than the length of the time value desired. This size discrepancy leads to problems as these hardware counters may not simply be expanded to the length desired. As but one problem, shorter length hardware counters may reset at some interval (e.g., determined by their length and timing resolution). Thus, a longer length time value may not simply be determined directly from a shorter hardware counter, as that hardware counter may have been reset.

What is desired, therefore, are simple mechanisms that allow the extension of shorter timestamp values that are available from underlying hardware.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
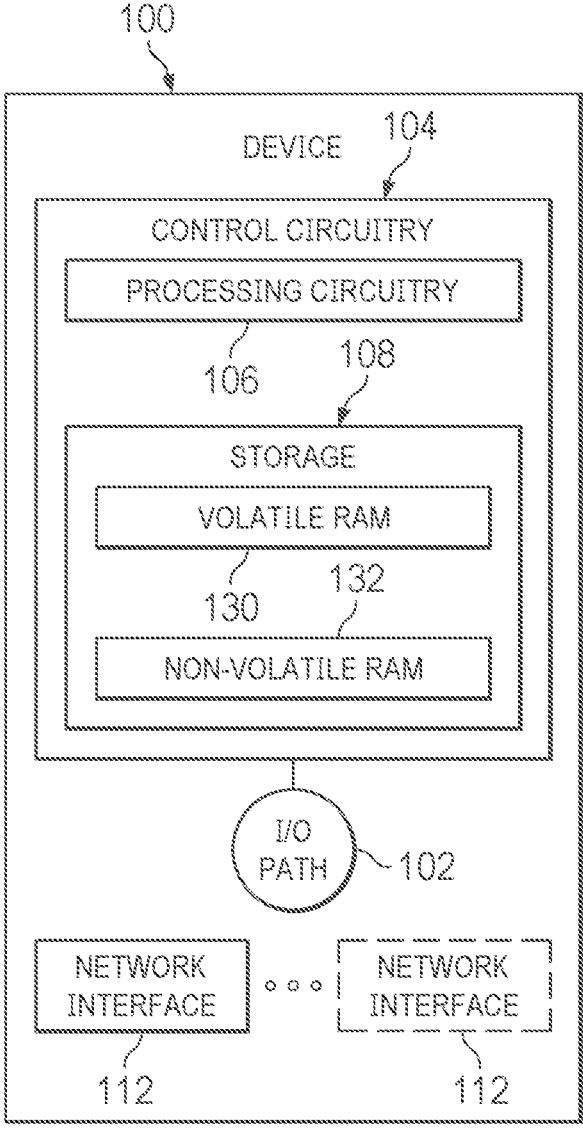
FIG. 1 is a block diagram depicting one embodiment of a general architecture of a network device for generating an extended bit length counter.

As discussed, precision timing is required in many computing applications. One context where precision timing is especially important is networking, where the implementation and use of network devices may depend on accurate timing. Hardware timers (e.g., in ASICs, CPUs, etc.) referred to herein generally as Time of Day (TOD) counters, may be used for providing timestamps for use in applications utilizing such precision timing.

To illustrate, timestamps may be used in the implementation of certain protocols involved with the synchronization of timing between network elements in a network environment. For example, the IEEE 1588v2 Precision Time Protocol (PTP) defines a packet-based time synchronization method that provides frequency, phase, and TOD information with sub-microsecond accuracy. Each PTP network element maintains a PTP free-running TOD counter used as a basis for generating recovered clock signals and computing latencies, offsets, or drift rates. The free-running counter can be associated with a local system clock on a network device asynchronously to the clocks maintained by other members of the PTP network. Correction factors may be applied to the free-running clock in order to arrive at a local time value that is synchronized to a master clock. Alternatively, an implementation of PTP may involve correcting the TOD counter maintained in hardware to eliminate timing or other errors.

As discussed, certain hardware may provide counters that can be used for generating the timestamps needed for PTP packets. In particular, hardware such as a switch chip (e.g., an ASIC) used in networking devices may generate a (e.g., 32-bit or 48-bit) nanosecond-precision timestamps using a nanosecond TOD counter internal to the chip. In many cases, however, longer (e.g., having a greater number of bits) TOD values may be desired for various implementations of PTP. For example, a PTP implementation on a network element (e.g., a PTP implementation executing in user space on a network element) may utilize 64-bit nanosecond precision timestamps. These 64-bit timestamps may be utilized by a particular PTP implementation to, for instance, add an ingress timestamp to a received packet (e.g., a received PTP packet) or an egress timestamp to a packet before transmission (e.g., a PTP packet such as a follow-up message).

This type of PTP implementation thus precludes the direct use of the shorter (e.g., 32-bit or 48-bit) timestamp generated by a switch chip. Namely, these 32-bit or 48-bit values cannot be used directly because these timestamps "roll over" (e.g., reset) approximately every 4 seconds (for 32-bit timestamps with nanosecond precision), or approximately every three days (for 48-bit timestamps with nanosecond precision). That is, a 32-bit nanosecond precision timestamp is ambiguous with another time approximately four seconds later while a 48-bit nanosecond precision timestamp may become ambiguous approximately every three days (e.g., 78 hours). To obtain a 64-bit (or larger) timestamp with nanosecond precision, it is thus the case that a timestamp that can be obtained from a switch chip or other hardware (e.g., a 32-bit or 48-bit timestamp) must be expanded to the longer 64-bit (or longer) timestamp desired.

Complicating this problem is that certain implementations of PTP (or portions thereof) may be implemented in different layers of the processing hierarchy on a network element. For example, packet ingress timestamps may be added to a packet header when the packet is processed by a kernel space packet driver while packet egress timestamps may be added by a user space PTP application.

Thus, not only may it be necessary to expand a timestamp from the length available from hardware at a network device, but additionally it may be desirable that this generated expanded timestamp be easily accessible at both the kernel level (e.g., by a kernel level process) and by user space applications. The problems presented with respect to the use of hardware counters in a PTP implementation are thus a microcosm of a larger problem—how can timestamps of greater length, and at least the same precision, be generated from underlying (e.g., hardware) timers that are shorter in length.

One solution to this type of problem may be to implement specific additional hardware (e.g., a Field Programmable Gate Array (FPGA)) that can generate timestamp values of a desired length in association with the shorter timestamp maintained by hardware in the switch chip at the network device using a counter (e.g., a 64-bit counter) in the FPGA itself. Such a solution may synchronize a counter in hardware to the counter maintained in the FPGA. A timestamp value of the desired length can then be generated by combining the counter maintained in the FPGA with the value of the counter in the hardware. These solutions are obviously less than ideal as they require specialized hardware, increasing both the expense and complexity of the design of a computing device.

What is desired, therefore, are simple mechanisms that allow the extension of shorter timestamp values that are available from underlying hardware. Moreover, it is likewise desirable to make such extended timestamps easily accessible to both kernel space processes and user space processes alike.

To address these desires and issues, among others, embodiments may extend an original bit length (e.g., 48 bits) TOD counter maintained by hardware of a network device (e.g., a timestamp value maintained by the hardware) to generate an extended length TOD counter (referred to herein also as an extended length timestamp or counter, or just extended timestamp or counter) of a longer bit length (e.g., 64 bits) based on a rollover counter, where this rollover counter may be incremented based on the detection of rollovers of the original bit length hardware TOD counter. The rollover counter may be of a bit length corresponding to a bit length desired for extension of the original bit length of the hardware TOD counter (e.g., the difference between a desired length of the extended TOD counter and the bit length of the original bit length TOD counter). For example, if the desired bit length of the extended TOD counter is 64 bits and the bit length of the TOD counter in hardware is 48 bits, the rollover counter may be 16 bits in size.

In one embodiment, the hardware (e.g., the switch chip) at a network device may generate an interruption when the original length TOD counter maintained by the hardware rolls over (e.g., in a specific interrupt register or on a specific line, etc.). This rollover interrupt may be monitored and, when such an interrupt is detected, the rollover counter may be incremented. In another embodiment, the original bit length TOD counter may be checked based on a rollover timer to determine if a rollover of the original length TOD counter has occurred. If a rollover is detected, the rollover counter may be incremented.

Specifically, a rollover timer may be maintained, where the period of the rollover timer may be less than a rollover period corresponding to the original bit length and precision of the TOD counter maintained by the hardware. In other words, the rollover period may be less than the time needed for the original bit length TOD counter to rollover (the "rollover time") based on the bit length and precision of that counter. For example, the period of the rollover timer may be less than the 78 hour rollover time of a 48-bit TOD counter maintained in hardware. At the expiration of each rollover period of the rollover timer (i.e., when the rollover timer has expired) the value of the original bit length hardware TOD counter may be obtained from the hardware of the network element (e.g., from the switch chip). Based on the obtained value of the original bit length hardware TOD counter it can be determined if a rollover of that original TOD counter has occurred.

To detect a rollover, the current value of the original bit length hardware TOD counter can be compared with a previous value of the original bit length hardware TOD counter (e.g., as stored from the previous time the value of the original bit length hardware TOD counter was obtained). If the current value of the original bit length hardware TOD counter is less than the previous value, it can be determined that a rollover of the original bit length hardware TOD counter has occurred, and the rollover counter incremented. The current value of the original bit length hardware TOD counter can then be stored as the previous value of the original bit length hardware TOD counter, and the rollover timer reset. If the current value of the original bit length hardware TOD counter is not less than the previously obtained value of that counter it can be determined that a rollover of the original bit length hardware TOD counter has not occurred. Here, the current value of the original bit length hardware TOD counter can be stored as the previous value of the original bit length hardware TOD and the rollover timer reset without incrementing the rollover counter.

An extended length TOD counter of the longer bit length (e.g., 64 bits) can thus be provided based on the maintained rollover counter. In particular, to generate a value for the extended TOD counter a current value of the original bit length hardware TOD counter may be obtained. In certain embodiments, an extended length TOD counter value can be provided in response to a request, such as a request from a kernel space function or a user space application executing on the network device. These kernel space or user space modules may be, for example, adapted for providing an ingress or egress timestamp for a packet (e.g., a PTP packet). Accordingly, the reception of such a request for the extended length timestamp may trigger the obtainment of the current value of the original bit length hardware TOD counter from the hardware. A rollover determination may then be made (e.g., the obtained current value of the original bit length hardware TOD counter can be compared with a stored previous value of the original bit length hardware TOD counter) and the rollover counter incremented if it is determined a rollover of the original bit length hardware TOD counter has occurred. Moreover, as the current value of the original bit length hardware TOD counter is being obtained, any rollover timer being maintained may also be reset and the obtained current value of the original bit length hardware TOD counter stored as the previous value of the original bit length hardware TOD (e.g., for a subsequent rollover determination).

A value for the extended TOD counter can then be generated based on the value of the maintained rollover counter, and both the bit length and the value of the original bit length hardware TOD counter. In particular, a value for the extended TOD counter can be generated by left shifting the bits of the maintained rollover counter by the bit length of the original bit length hardware TOD counter (e.g., 48 bits) and adding the resulting value to the obtained current value of the original bit length hardware TOD counter as follows:

extended TOD counter value (e.g., 64 bits)=rollover counter (e.g., 16 bits)<<bit length of hardware TOD counter (e.g., 48 bits)+value of original bit length hardware TOD counter In some embodiments, this extended TOD counter value may be determined by an extended timestamp module (e.g., hardware, software, or some combination of hardware and software) executing in kernel space of the operating system of the network device. This extended timestamp module may provide a kernel level function or interface (used herein interchangeably) that allows kernel space processes such as drivers or the like to access the value for the extended TOD counter through this kernel level function, such that a call to that kernel level function by a kernel space process returns a value for the extended TOD counter. The extended TOD counter may also be made available through a file system interface for kernel level processes provided by the operating system on the network device, such as the proc filesystem. For example, the extended TOD counter may be associated with a file name in the proc filesystem. When this file name is accessed (e.g., by a user level application or process, such as a PTP related process) this access may cause a call to the extended timestamp module to be made (or may cause a call to a function which, in turn, calls the extended timestamp module) and the extended TOD counter value determined by the extended timestamp module to returned in response to the access to the associated file name in the proc filesystem. In this manner, embodiments may provide such an extended TOD counter on demand and with low latency to both kernel space processes (e.g., packet drivers providing ingress timestamps) and user space applications (e.g., PTP application providing egress timestamps). Moreover, by providing such an extended TOD counter, a larger maximum value for such timers may be provided along with longer intervals between rollovers (or effectively no rollovers) as desired.

It will be noted that while embodiments as disclosed herein may be discussed with respect to the generation of extended length timestamps in the context of network devices, embodiments may have applications more generally in almost any type of computing device where it is desired to generate such extended length timestamps from an underlying shorter length hardware TOD counter. Moreover, it should also be noted here that while certain embodiments will be discussed and illustrated with respect to use with PTP and, in particular with respect to a 48-bit TOD counter in the hardware and its expansion to a 64-bit TOD counter in the context of an implementation of PTP, other embodiments may be applied more generally to extend a shorter timestamp value of a certain length with additional bits to form an extended timestamp of an (arbitrary) greater length. Accordingly, embodiments may have applications well beyond PTP in almost any setting where applications of kernel processes (e.g., drivers) or user applications may need access to timestamps of greater length than that provided by hardware or other mechanisms on a computing device.

FIG. 1 is a block diagram depicting a general architecture of a network device adapted to generate extended length timestamps in accordance with certain embodiments. Network device 100 may be a router, switch, server, or any other computing device that may be configured to control or process network traffic. Network device 100 may receive data, including packets from hosts (not shown), via an input/output (I/O) path 102. I/O path 102 may provide packet data to control circuitry 104, which includes processing circuitry 106 and storage (i.e., memory) 108. Control circuitry 104 may send and receive commands, requests, and other suitable data using I/O path 102. I/O path 102 may connect control circuitry 104 (and specifically processing circuitry 106) to one or more network interfaces 112 to which other devices of a network (e.g., hosts) can be connected. These network interfaces 112 may be any type of network interface, such as an RJ45 ethernet port, a coaxial port, etc.

Control circuitry 104 includes processing circuitry 106 and storage 108. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor or "chips" (e.g., dual-core, quad-core, hexa-core, octa-core, or any suitable number of cores). In some embodiments, processing circuitry 106 is distributed across multiple separate processors or processing units, for example, multiple of the same type of processing units or multiple different processors. The circuitry described herein may execute instructions included in software running on one or more general purpose or specialized processors.

Storage 108 may be an electronic storage device that includes volatile random-access memory (RAM) 130, which does not retain its contents when power is turned off, and non-volatile RAM 132, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

Processing circuitry 106 may include a TOD counter (e.g., that may be used for generating a timestamp for various uses). For example, processing circuitry 106 may include a switch chip that includes such a TOD counter. This TOD counter may have a certain resolution (e.g., a nanosecond precision resolution) such that it is incremented based on this resolution (e.g., the TOD counter may be incremented every nanosecond). Additionally, the TOD counter of processing circuitry 106 may be of a certain length (e.g., a number of bits such as a 32-bit counter or a 48-bit counter). The TOD counter in processing circuitry 106 may thus rollover at a certain interval (the "rollover time") that is based on the size and resolution of that TOD counter.

As discussed, various applications or (sub)systems of the network device 100 may utilize or require an extended TOD counter of a greater bit length than the bit length of the TOD counter of processing circuitry 106. Here, network device 100 can generate such an extended bit length TOD counter (referred to herein also as an extended TOD counter, extended length counter, extended length timestamp or extended timestamp) from the TOD counter of processing circuitry 106. For example, control circuitry 104 may execute instructions for generating an extended TOD counter of a longer (extended) bit length based on a rollover counter, where this rollover counter may be incremented based on the detection of rollovers of the original bit length hardware TOD counter in processing circuitry 106.

An extended TOD counter having the longer bit length can thus be provided based on this maintained rollover counter. In particular, to generate a value for the extended TOD counter instruction executing on control circuitry 104 may obtain a current value of the hardware TOD counter (having a shorter original bit length) of processing circuitry 106. The value for the extended TOD counter can then be generated based on the value of the maintained rollover counter, and both the bit length and the value of the original bit length hardware TOD counter. In particular, a value for the extended TOD counter can be generated by left shifting the bits of the maintained rollover counter by the bit length of the original bit length hardware TOD counter and adding the resulting value (of that bit shift) to the obtained current value of the original bit length hardware TOD counter. This extended TOD counter can then be provided for use by applications or subsystems (e.g., processes or hardware) of the network device 100.

Figure 2:
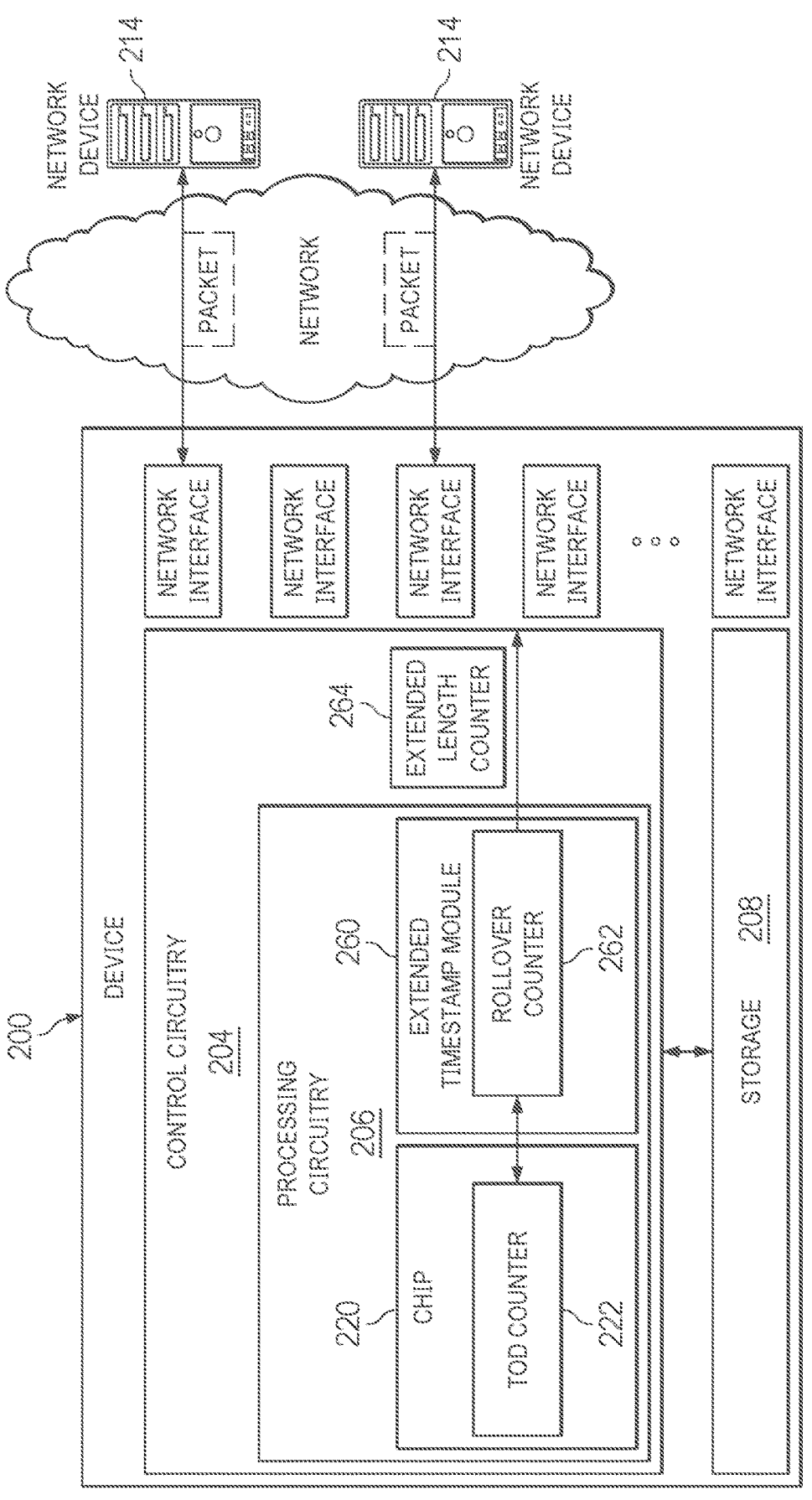
FIG. 2 is a block diagram depicting one embodiment of a network device for generating an extended bit length counter.

Moving now to FIG. 2, an embodiment of a network device adapted to generate extended length timestamps is depicted in more detail. Network device 200 includes processing circuitry 206 including a chip 220, such as a switch chip or another type of ASIC or processing unit, that includes a TOD counter 222 of a certain bit length (referred to as the original bit length) that increments at a specified interval (e.g., a nanosecond). Such a chip 220 may be utilized in the processing of packets (e.g., data packets, management packets, packets for other protocols, etc.) received from other network devices 214.

Network device 200 also includes extended timestamp module 260 adapted to generate extended bit length TOD counter 264 from the TOD counter 222 of chip 220. Extended timestamp module 260 may be implemented in hardware, software, or any suitable combination of hardware and software (e.g., in control circuitry 204). For example, extended timestamp module 260 may be a software program stored on storage 208 (e.g., non-volatile RAM) and executed by processing circuitry 206. Extended timestamp module 260 is adapted to maintain rollover counter 262 by incrementing rollover counter 262 based on the detection of rollovers of the original bit length hardware TOD counter 222 in chip 220.

Extended timestamp module 260 can generate extended bit length counter 264 based on the maintained rollover counter 262 and a value of TOD counter 222, where the extended bit length counter 264 is of a second, longer, bit length than the original bit length of TOD counter 222. Accordingly, rollover counter 262 may be of a bit length corresponding to a bit length desired for extension of the original bit length of the hardware TOD counter 222 (e.g., the difference between a desired length of the extended TOD counter 264 and the bit length of the original bit length TOD counter 222).

According to one embodiment then, when device 200 starts up, or is otherwise initialized (or reinitialized), the extended timestamp module 260 can synchronize TOD counter 222 in chip 220 to a particular clock, such as the system clock of the network device 200 or another clock. Extended timestamp module 260 detects rollovers of the original length TOD counter 222 in chip 220 and increments rollover counter 262 when these rollovers are detected. Extended length counter 264 of the longer bit length can thus be provided based on this maintained rollover counter 262. In certain embodiments, extended length TOD counter 264 can be provided in response to a request received at the extended timestamp module 260.

To generate a value for the extended length counter 264, extended timestamp module 260 can obtain a current value of the original bit length TOD counter 222. A value for the extended length counter 264 can then be generated based on the value of the maintained rollover counter 262, and both the bit length and the obtained value of the original bit length hardware TOD counter 222. In particular, a value for the extend length counter 264 can be generated by left shifting the bits of the maintained rollover counter 262 by the bit length of the original bit length hardware TOD counter 222 and adding the resulting value to the obtained current value of the original bit length hardware TOD counter 222.

Figure 3:
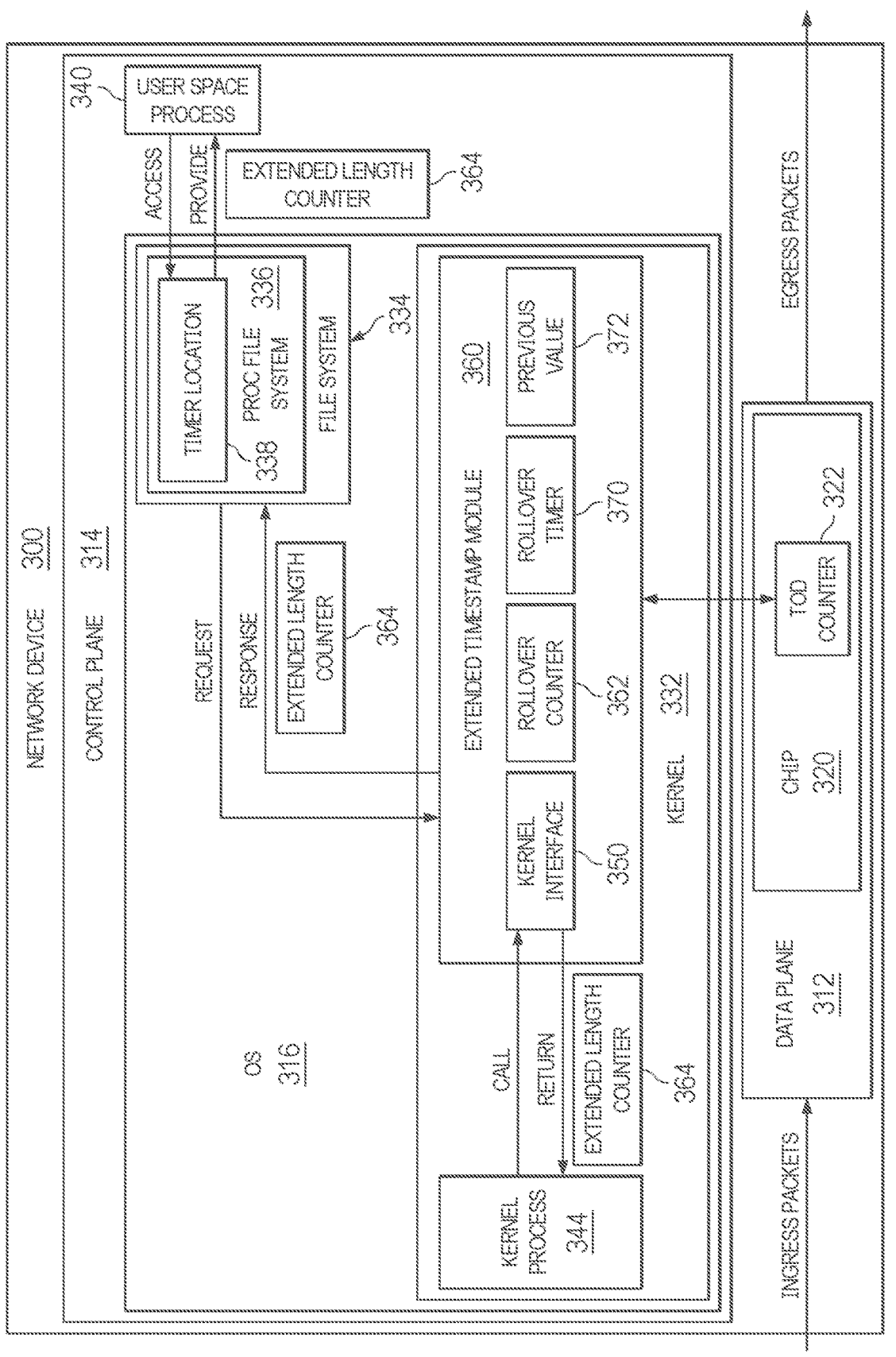
FIG. 3 is a block diagram depicting one embodiment of a network device for generating an extended bit length counter.

FIG. 3 is a more detailed depiction of one embodiment of a network device adapted to generate extended length timestamps. Network device 300 includes a data plane 312 and a control plane 314. The data plane 312 is adapted to receive packets (ingress packets) via ports (not shown) of the network device 300, process the packets and, as appropriate, route packets (egress packets) internally to the network device 300 and via ports of the network device 300. Data plane 312 thus includes processing circuitry for packet processing including a chip 320, such as a switch chip or another type of ASIC or processing unit. This chip includes a TOD counter 322 of a certain original bit length (e.g., 48 bits) that increments at a specified interval (e.g., a nanosecond). Such a chip 320 may be utilized in the processing of received packets (e.g., data packets, management packets, packets for other protocols, etc.). The data plane 312 is also adapted to gather data plane information and to provide this data plane information to the control plane 314. Data plane information includes, for example, network usage data, flow information based on the sampling of packets received by the data plane, information related to queue depths on ingress or egress buffers (not shown) in the data plane, other data traffic statistics or other types of data plane information.

Control plane 314 is adapted to manage the operation of the network device 300 (e.g., at least partially based on the data plane information received from data plane 312). More specifically, the control plane 314 is adapted to manage the operation of the data plane 312, including the processing of packets. Control plane 314 thus includes an operating system 316 for managing network device 300. Operating system 316 include kernel 332, where this operating system kernel 332 includes an extended timestamp module 360 adapted to generate an extended bit length counter 364 from TOD counter 322 of chip 320, where extended bit length counter 364 is of a longer bit length (e.g., 64 bits) than the original TOD counter 322 of the chip 320.

In particular, as extended timestamp module 360 may execute in kernel space, the extended timestamp module 360 may provide kernel level function or interface 350 that allows kernel space process 344, such as drivers or the like, to access extended bit length counter 364 through this kernel level interface 350. Namely, a call to that kernel level interface 350 by kernel space process 344 returns a value for extended bit length counter 364.

Extended bit length counter 364 may also be made available through a file system interface for kernel level processes provided by the operating system 316 on the network device, such as proc filesystem 336 (which may be part of filesystem 334 provided by the operating system 316). For example, extended bit length counter 364 may be associated with a file name (referred to as the timer location) 338 in proc filesystem 336. When this time location (e.g., file name) is accessed (e.g., by a user level application or process 340) this access may cause a call to the extended timestamp module 360 to be made, or may cause a request to extended timestamp module 360. A value for extended bit length counter 364 determined by extended timestamp module 360 is then returned in response to the access to the associated timer location 338 in the proc filesystem 336. In this manner, embodiments may provide values for extended bit length counter 364 on demand and with low latency to both kernel space processes 344 (e.g., packet drivers providing ingress timestamps, etc.) and user space applications 340.

As discussed, in some cases when network device 300 starts up, or is otherwise initialized (or reinitialized), extended timestamp module 360 can synchronize TOD counter 322 in chip 320 to a particular clock, such as the system clock of the network device 300 or another clock. In some embodiments, the proc filesystem 336 may be utilized (e.g. by a user space process), to write a value for the extended bit length counter 364. When a value is written to extended bit length counter 364, extended timestamp module 360 may receive this value for extended bit length counter 36 and update both rollover counter 362 and hardware TOD counter 322 (if necessary) based on the value written to extended bit length counter 364 through proc filesystem 336 (e.g., the values of rollover counter 362 and hardware TOD counter 322 will be written to reflect the written value). Other applications for this type of functionality may also include debugging or adjusting a TOD counter while it is running.

To generate (a value for) extended bit length counter 364 of a longer bit length (e.g., 64 bits) than the original bit length (e.g., 48 bits) TOD counter 322, timer module 360 may extend original bit length (e.g., 48 bits) TOD counter 322 based on rollover counter 362 of a bit length corresponding to a bit length desired for extension of the original bit length of hardware TOD counter 322 (e.g., the difference between a desired length of the extended TOD counter 364 and the bit length of the original bit length TOD counter 322). For example, if the desired bit length of extended TOD counter 364 is 64 bits and the bit length of TOD counter 322 in chip 320 is 48 bits, rollover counter 362 may be 16 bits in size.

Specifically, timer module 360 increments rollover counter 362 based on the detection of rollovers of the original bit length hardware TOD counter 322. In one embodiment, the hardware (e.g., chip 320) may generate an interrupt when the original length TOD counter 322 rolls over. This rollover interrupt may be monitored by timer module 360 and, when such an interrupt is detected, timer module 360 may increment rollover counter 362. In another embodiment, the original bit length TOD counter 322 may be checked based on rollover timer 370 maintained by timer module 360 to determine if a rollover of the original length TOD counter 322 has occurred. If a rollover is detected by timer module 360, rollover counter 362 may be incremented.

According to one embodiment, timer module 360 maintains rollover timer 370, where the period of rollover timer 370 may be less than a rollover period corresponding to the original bit length and precision of the TOD counter 322 of chip 320. In other words, the rollover period may be less than the time needed for original bit length TOD counter 322 to rollover (the "rollover time") based on the bit length and precision of original bit length TOD counter 322. For example, the period of rollover timer 370 may be less than the 78 hour rollover time of a 48-bit TOD counter maintained in hardware. At the expiration of each rollover period of rollover timer 370 (i.e., when rollover timer 370 has expired) the value of the original bit length hardware TOD counter 322 may be obtained from chip 320 by timer module 360. Based on the obtained value of the original bit length hardware TOD counter 322, timer module 360 determines if a rollover of that original length TOD counter 322 has occurred.

To detect a rollover, timer module 360 compares a current value of the original bit length hardware TOD counter 322 (e.g., as obtained from chip 320) with previous value 372 of original bit length hardware TOD counter 322 (e.g., as stored from a previous time the value of the original bit length hardware TOD counter 322 was obtained). If the current value of the original bit length hardware TOD counter 322 is less than previous value 372, timer module 360 determines that a rollover of the original bit length hardware TOD counter 322 has occurred and increments rollover counter 362. Timer module 360 then stores the current value of the original bit length hardware TOD counter 322 as previous value 372 of the original bit length hardware TOD counter 322, and resets rollover timer 370. If the current value of the original bit length hardware TOD counter 322 is not less than previously obtained value 372 of that counter it can be determined that a rollover of the original bit length hardware TOD counter 322 has not occurred. Here, the current value of the original bit length hardware TOD counter 322 can be stored as previous value 372 of the original bit length hardware TOD counter 322 and the rollover timer 370 reset without incrementing rollover counter 362.

Timer module 360 provides extended length counter 364 of the longer bit length (e.g., 64 bits) based on rollover counter 362. In particular, to generate a value for extended length counter 364, timer module 360 obtains a current value of the original bit length hardware TOD counter 322. As discussed, in certain embodiments, a value for extended length counter 364 can be provided in response to a request, such as a request from a kernel space process 344 or a user space application 340 executing on the network device 300. Accordingly, the reception of such a request for the extended length counter 364 may cause timer module 360 to obtain a current value of the original bit length hardware TOD counter 322 from the chip 320. Timer module 360 can then make a rollover determination (e.g., by comparing the obtained current value of the original bit length hardware TOD counter 322 with the stored previous value 372 of the original bit length hardware TOD counter 322). Rollover counter 362 is incremented when timer module 360 determines a rollover of the original bit length hardware TOD counter 322 has occurred. Moreover, as the current value of the original bit length hardware TOD counter 322 is being obtained, any rollover timer 370 being maintained by timer module 360 may also be reset, and the obtained current value of the original bit length hardware TOD counter 322 stored as previous value 372 of the original bit length hardware TOD counter 322 (e.g., for a subsequent rollover determination).

Timer module 360 can generate a value for extended length counter 364 based on the value of the maintained rollover counter 362, and both the bit length and the value of the original bit length hardware TOD counter 322. This generated value for extended length counter 364 can then be provided in response to the request for extended length counter 364. In particular, a value for extended length counter 364 can be generated by left shifting the bits of the maintained rollover counter 362 by the bit length of the original bit length hardware TOD counter 322 (e.g., 48 bits) and adding the resulting value to the obtained current value of the original bit length hardware TOD counter 322 as follows:

> extended TOD counter value (e.g., 64 bits)=rollover counter (e.g., 16 bits)<<bit length of hardware TOD counter (e.g., 48 bits)+value of original bit length hardware TOD counter To illustrate some examples, suppose a 16 bit rollover counter has a value of 0xA4C1 and the value of a 48 bit original bit length hardware counter is 0x4A5B783C34DE, the value of an extended TOD counter of 64 bits may be obtained by left shifting the value of 0xA4C1 by 48 bits resulting in value of 0xA4C1000000000000. This value can then be added to the value of the 48 bit original length hardware counter to obtain the value of the 64 bit extended TOD counter: 0xA4C14A5B783C34DE. As another example, suppose a 16 bit rollover counter has a value of 0xBADD and the value of a 48 bit original bit length hardware counter is 0x1A2B3C4D5E67, the value of an extended TOD counter of 64 bits may be obtained by left shifting the value of 0xBADD by 48 bits resulting in value of 0xBADD000000000000. This value can then be added to the value of the 48 bit original length hardware counter to obtain the value of the 64 bit extended TOD counter: 0xBADD1A2B3C4D5E67.

Figure 4:
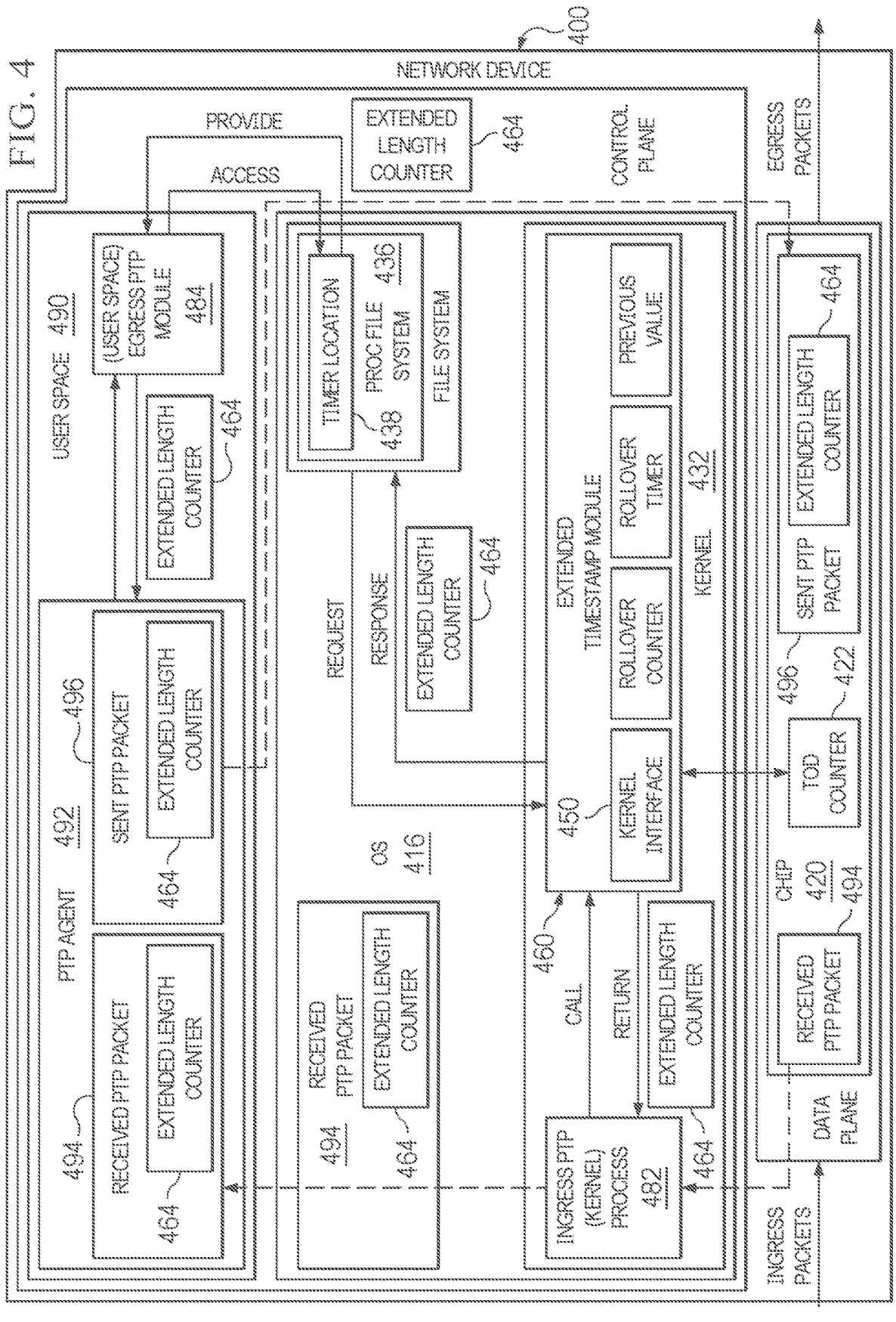
FIG. 4 is a block diagram depicting one embodiment of a network device for generating and using an extended bit length counter in the context of a PTP implementation on the network device.

While embodiments as disclosed may provide extended length timestamps from an underlying shorter length hardware TOD counter for almost any uses desired, embodiments may be particularly useful when applied to the generation of timestamps used in the implementation of certain protocols involved with the synchronization of timing between network elements in a network environment, such as PTP. FIG. 4 depicts one embodiment of a network device that generates extended length timestamps from an underlying hardware TOD counter for use in implementing PTP.

Here, network device 400 includes PTP agent 492 including instructions executing in user space 490 of network device 400. This PTP agent 492 may be adapted to implement PTP on network device 400 and is thus responsible for processing PTP packets (messages) received at the network device 400, and sending PTP packets in accordance with the implementation of PTP at the device (e.g., Sync, Follow Up, Delay_Req, Delay_Resp packets, etc.).

Packets associated with PTP (e.g., received PTP packet 494 and sent PTP packet 496) are thus received and sent through chip 420 (e.g., a switch chip) of the network device 400. When a PTP packet (ingress packet 494) arrives at the network device it is processed by chip 420 and provided to PTP agent 492. Similarly, when a PTP packet (egress packet 496) is sent by PTP agent 492 it is provided to the chip 420 for sending.

As discussed, PTP is a time synchronization method that provides frequency, phase, and TOD information with submicrosecond accuracy. Accordingly, to implement PTP a timestamp is assigned to each PTP packet. Specifically, an ingress timestamp may be provided for received PTP packet 494 (e.g., a sync packet) at ingress, while an egress timestamp may be provided for sent PTP packet 496 (e.g., a follow-up packet) before that PTP packet is sent. In one embodiment, an ingress timestamp may be assigned to received PTP packet 494 by ingress PTP process 482 while an egress timestamp may be assigned to PTP packet 496 to be sent using egress PTP module 484. Ingress PTP process

482 may be a kernel space packet driver or other kernel space process and egress PTP module 484 may be a user space application.

While chip 420 may include a nanosecond TOD counter 422 of an original bit length (e.g., a 48 bit counter), longer TOD values may be utilized as timestamps for implementation of PTP by PTP agent 492. For example, PTP agent 492 may utilize 64-bit nanosecond precision timestamps. Accordingly, extended timestamp module 460 is adapted to generate values for such an extended bit length counter 464 (e.g., of 64 bits) for use with PTP agent 492 based on TOD counter 422 of chip 420 according to embodiments as previously discussed. This extended timestamp module 460 may execute in kernel space of kernel 432 of operating system 416 of network device 400 and provide kernel level function or interface 450 that allows ingress PTP process 482 in kernel space to access extended bit length counter 464 through this kernel level interface 450. Thus, as ingress PTP process 482 processes received PTP packet 494 it may call that kernel level interface 450 to obtain a value for extended bit length counter 464, and include that value for extended bit length counter 464 with received PTP packet 494 before received PTP packet 494 is provided to PTP agent 492.

Additionally, extended timestamp module 460 may make extended bit length counter 464 available through proc filesystem 436 of operating system 416 of the network device 400. Thus, as PTP agent 492 is processing PTP packet 496 in user space 490 for sending, the PTP agent 492 may call egress PTP module 484 to obtain a value for extended length counter 464 to include in PTP packet 496 before sending PTP packet 496. To obtain the value for extended length counter 464, egress PTP module 484 may access a timer location (e.g., file name) 438 in proc filesystem 436, where the timer location 438 is associated with extended length counter 464. This access causes a request for extended bit length counter 464 from extended timestamp module 460. A value for extended bit length counter 464 determined by extended timestamp module 460 is then provided to egress PTP module 484 in response to the access to the associated timer location 438 in the proc filesystem 436. Egress PTP module 484 provides the value for the extended bit length counter 464 to PTP agent 492 for inclusion in PTP packet 496 before it is sent.

Figure 5:
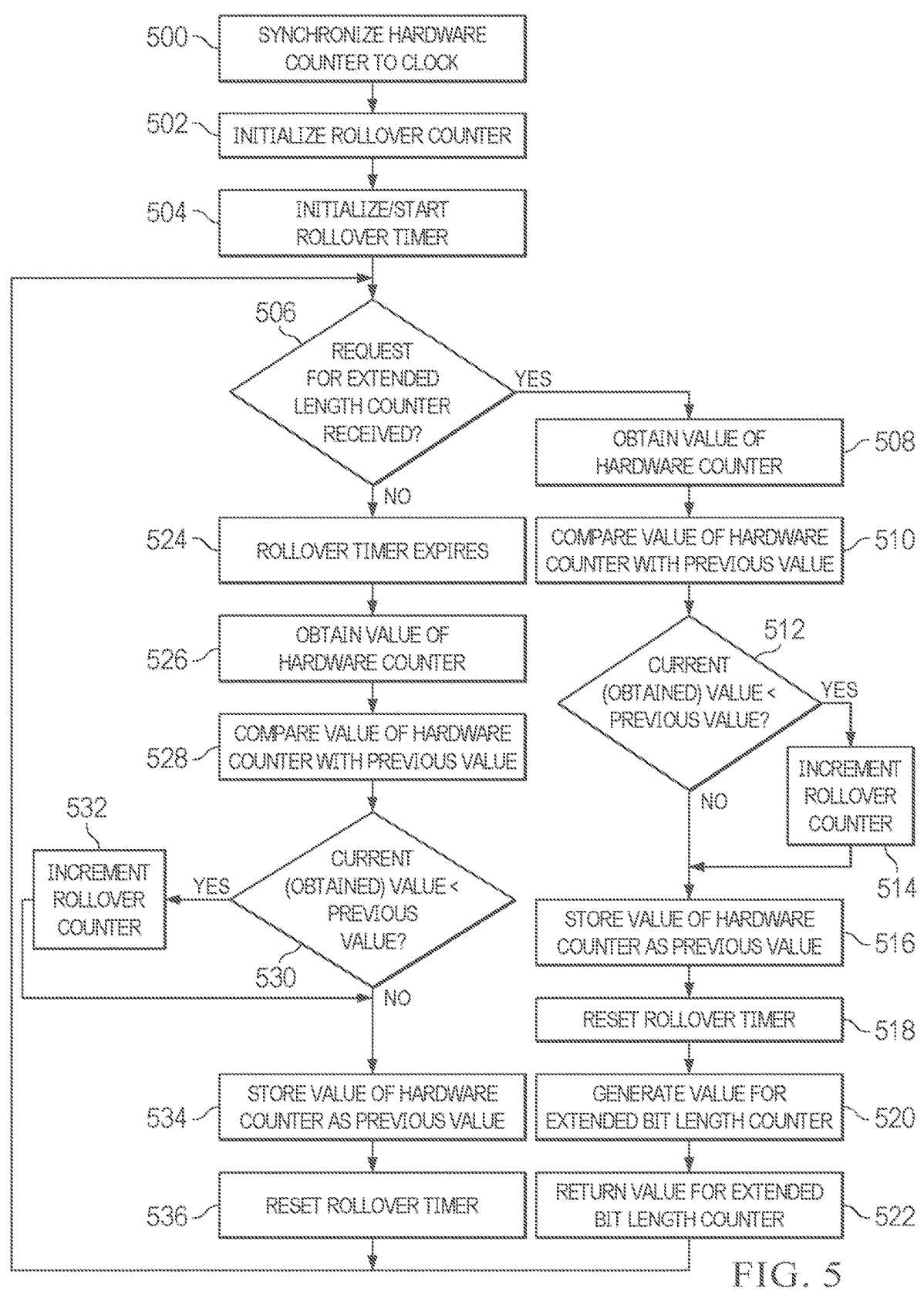
FIG. 5 is a flow diagram for one embodiment of a method for generating an extended bit length counter.

FIG. 5 depicts one embodiment of a method for generating a value for an extended bit length counter based on an underlying shorter length hardware counter. Such a method may be implemented, for example, by an extended timestamp module implemented by control circuitry of a network device. Initially, the shorter (original) bit length hardware counter may be synchronized to a particular clock, such as the system clock of the network device or another clock (STEP 500). Additionally a rollover counter for counting rollovers of the original length hardware counter is initialized (e.g., set to zero), and a rollover timer having a rollover period initialized and started (STEPS 502 and 504). The rollover counter may be of a bit length corresponding to a bit length desired for extension of the original bit length of the underlying hardware counter (e.g., the difference between a desired length of the extended bit length counter and the bit length of the original bit length hardware counter). For example, if the desired bit length of the extended TOD counter is 64 bits and the bit length of the hardware counter is 48 bits, the rollover counter may be 16 bits in size. The rollover period may be less than the rollover time needed for the original bit length hardware counter to rollover based on the bit length and precision of that counter.

During a rollover period then (e.g., before the rollover timer has expired) a request for the (value of) the extended length counter may be received (STEP 506). If such a request for the extended length counter is received (Y branch of STEP 506), a (current) value of the original bit length hardware counter may be obtained from the hardware (STEP 508). The current value of the original bit length hardware counter can be compared with a previous value of the original bit length hardware counter (e.g., as stored from the previous time the value of the original bit length hardware counter was obtained) (STEP 510). If the current value of the original bit length hardware counter is less than the previous value (Y branch of STEP 512), it can be determined that a rollover of the original bit length hardware counter has occurred, and the rollover counter incremented (STEP 514).

The obtained current value of the original bit length hardware counter can be stored as the previous value of the original bit length hardware counter (STEP 516), and the rollover timer reset (STEP 518). A value for the extended bit length counter can then be generated based on the value of the maintained rollover counter, and both the bit length and the value of the original bit length hardware counter (STEP 520). The value for the extended bit length counter can then be returned in response to the received request (STEP 522). In particular, a value for the extended bit length counter can be generated by left shifting the bits of the maintained rollover counter by the bit length of the original bit length hardware counter (e.g., 48 bits) and adding the resulting value to the obtained current value of the original bit length hardware counter.

If no request for the extended bit length counter is received during the rollover period of the rollover timer at the expiration of the rollover timer (e.g., when the rollover period has elapsed) (STEP 524), the (current) value of the original bit length hardware counter may be obtained from the hardware comprising the hardware counter (STEP 526). The current value of the original bit length hardware counter can be compared with the previous value of the original bit length hardware counter (STEP 528). If the current value of the original bit length hardware counter is less than the previous value (Y branch of STEP 530), it can be determined that a rollover of the original bit length hardware counter has occurred, and the rollover counter incremented (STEP 532). The current value of the original bit length hardware counter can be stored as the previous value of the original bit length hardware counter (STEP 534), and the rollover timer reset (STEP 536) to begin the next rollover period.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the disclosure will be employed without a corresponding use of other features, and features described with respect to one embodiment may be combined with features of other embodiments without departing from the scope and spirit of the disclosure as set forth.

What is claimed is:

1. A network device, comprising:
processing circuitry, including:
a switching circuit including a time of day (TOD) counter of a first bit length; and
an extended timestamp module adapted for generating a value for an extended bit length TOD counter for a second bit length greater than the first bit length by:
maintaining a rollover counter, wherein a value of the rollover counter is incremented based on a detection of a rollover of the TOD counter and the rollover counter has a second bit length;
obtaining a first value of the TOD counter from the switching circuit of the network device, wherein the extended timestamp module generates the value for an extended bit length TOD counter based on the value of the rollover counter and the obtained value of the TOD counter, wherein the extended bit length TOD counter has a third bit length that is the sum of the first bit length and the second bit length.

2. The network device of claim 1, wherein the extended timestamp module is executing in kernel space of an operating system executing on the processing circuitry of the network device.

3. The network device of claim 1, wherein the rollover counter is incremented based on a comparison of the obtained first value of the TOD counter and a previous value of the TOD counter.

4. The network device of claim 1, wherein the extended timestamp module provides an interface for a kernel process and an interface for a user space application.

5. The network device of claim 4, wherein the first value of the TOD counter is obtained when a request for the value for the extended bit length TOD counter is received through the interface for the kernel process or the interface for the user space application.

6. The network device of claim 5, wherein the detection of the rollover of the TOD counter is performed when the request for the value for the extended bit length TOD counter is received through the interface for the kernel process or the interface for the user space application.

7. A method for increasing precision of a hardware counter, comprising:
maintaining a rollover counter, wherein the rollover counter is incremented based on a detection of a rollover of a first counter in hardware of a computing device, and wherein the first counter is a time of day (TOD) counter having a first bit length;
obtaining a first value of the first counter from the hardware of the computing device; and
generating a value for an extended bit length TOD counter based on a value of the rollover counter and the obtained first value of the first counter, wherein the extended bit length TOD counter has a second bit length greater than the first bit length.

8. The method of claim 7, wherein the detection of rollover of the first counter comprises:
obtaining a second value of the first counter from the hardware of the computing device;
determining if the obtained second value of the first counter is less than a previously obtained value of the first counter; and detecting the rollover when the obtained second value is less than the previously obtained value.

9. The method of claim 8, wherein the first obtained value and the second obtained value are the same obtained value.

10. The method of claim 8, wherein the second value of the first counter is obtained based on reception of an interrupt from the hardware.

11. The method of claim 8, wherein the second value of the first counter is obtained based on expiration of a rollover timer associated with the rollover counter.

12. The method of claim 11, wherein the rollover timer has a rollover period less than a rollover time of the first counter.

13. The method of claim 7, wherein a bit length of the rollover counter corresponds to a difference between the second bit length and the first bit length.

14. The method of claim 7, wherein generating the value for the extended bit length counter comprises left shifting the value of the rollover counter by a number of bits corresponding to the first bit length and adding the first value of the first counter to a result of the left shifting of the value for the rollover counter.

15. A non-transitory computer readable medium, comprising instructions for:

incrementing a rollover counter based on a detection of a rollover of a first counter in hardware of a computing device, and wherein the first counter is a time of day (TOD) counter having a first bit length;

obtaining a first value of the first counter from the hardware of the computing device; and generating a value for an extended bit length TOD counter based on a value of the rollover counter and the obtained first value of the first counter, wherein the extended bit length TOD counter has a second bit length greater than the first bit length.

16. The non-transitory computer readable medium of claim 15, wherein the instructions are executable in kernel space of the computing device.

17. The non-transitory computer readable medium of claim 15, wherein the instructions are further for detecting the rollover when the obtained first value of the first counter is less than a previously obtained value of the first counter.

18. The non-transitory computer readable medium of claim 15, wherein the first value is obtained in response to receiving a request for the extended bit length counter.

19. The non-transitory computer readable medium of claim 15, wherein the first value is obtained based on expiration of a rollover timer.

20. The non-transitory computer readable medium of claim 19, wherein the rollover timer has a rollover period less than a rollover time of the first counter.

* * * * *